Nov. 10, 1970 R. W. MURPHY 3,540,003

COMPUTER MONITORING SYSTEM

Filed June 10, 1968

6 Sheets-Sheet 1

INVENTOR
ROBERT W. MURPHY
BY Owen Lamb
AGENT

Nov. 10, 1970 R. W. MURPHY 3,540,003

COMPUTER MONITORING SYSTEM

Filed June 10, 1968

6 Sheets-Sheet 2

RC - RESET CONTROLS
LF - LENGTH OF FIELD
OF - OPERATION ON FIELD

Nov. 10, 1970 R. W. MURPHY 3,540,003

COMPUTER MONITORING SYSTEM

Filed June 10, 1968 6 Sheets-Sheet 6

United States Patent Office 3,540,003

Patented Nov. 10, 1970

3,540,003

COMPUTER MONITORING SYSTEM

Robert W. Murphy, Poughkeepsie, N.Y., assignor to International Business Machines Corporation, Armonk, N.Y., a corporation of New York Filed June 10, 1968, Ser. No. 735,892

Int. Cl. G06f *11/00*

U.S. Cl. 340—172.5 5 Claims

ABSTRACT OF THE DISCLOSURE

Apparatus for monitoring the operation of a computer and for accumulating statistics relative to the activity of various elements of the computer or for plotting the performance of its program. The monitor includes an associative memory for retaining data corresponding to states of the computer and a supplementary storage for collecting statistics relative to the states stored in the associative memory. Data path switching controlled by a program in the monitor is provided so that monitored data may be routed to any field of the associative memory. This allows the execution of parallel program instructions, and simultaneous routing of data for real-time analysis of the computer operation.

BACKGROUND OF THE INVENTION

Field of the invention

This invention relates to computer performance evaluation systems and more particularly to a computer monitor utilizing an associative memory.

Description of the prior art

Evaluation systems which have been designed to collect, reduce, and present performance data can be categorized into counters and plotters. The degree of precision of the accumulation of data depends to a large extent on the monitoring procedure used. Furthermore, the results of the accumulation may be made available to the user in explicit detailed form (such as a full program trace output) or in a summary form (such as the total wait time counted in an eight hour shift).

Counters have the advantage of being very precise and in providing a variety in the choice of data. They have the disadvantage that the output is limited to statistics and timing and the procedure requires the user to know what to look for.

Plotters overcome the disadvantages of counters by providing an output which indicates sequence as well as statistics and timing, and tend to reveal the unexpected. Plotters however have the disadvantage of low resolution and the choice of data is limited to addresses and a few status conditions.

Both classes of systems show common disadvantages such as the necessity for painstaking preparation by the user, the necessity for the subsequent processing of the recorded data, and in the problem of identifying the programs and addresses.

SUMMARY OF THE INVENTION

It is a primary object of this invention to provide a monitoring system for evaluating the performance of a computer which overcomes the limitations of previous monitoring systems.

It is a further object of this invention to provide a tool for debugging and improving program efficiency in a stored program computer.

It is also an object of this invention to provide means for monitoring a program while the program is actually being performed by an operating computer system.

Briefly, in accordance with the invention an associative memory is interfaced with a stored program computer system to obtain and store essential data describing memory addresses and operation codes of the instructions as they are executed by the computer. This information identifies blocks of instructions which are always executed sequentially as well as the linkages among the blocks. The linkages generally define alternate program paths based upon conditional branch instructions. The information obtained defines the logical structure of the program being executed by the computer.

The logical organization of the associative memory and its system of registers, data paths and controls is designed to perform an algorithm which identifies entry, exit, and destination points of blocks of sequential instructions. From this collected data a flow chart of a program is constructed which describes the activity of the program executed by the computer.

The foregoing and other objects, features and advantages of the invention will be apparent from the following more particular description of a preferred embodiment of the invention as illustrated in the accompanying drawings.

BRIEF DESCRIPTION OF THE FIGURES OF THE DRAWINGS

FIGS. 3*a*, 3*b*, and 3*c* are block diagram illustrations of the assignment of the next counter to the next execution area;

INTRODUCTION

The fundamental problem in monitoring the performance of a computer system is the existence of too much data. For any hardware monitor to be practical, it must be able to reduce the data to a manageable amount.

The associative memory or content addressable memory is used to advantage for its unique ability to record only significant data. The memory can be instructed to record datum only if it is new, that is, if the datum has already been examined and stored it is not necessary to store it again.

In the present device, the basic associative processes of interrogation and storage are extended by means of a system of data routing and word-field control, into a capability for performing advanced data reduction and data processing algorithms. The algorithms are programmed and retained in a program storage where they may be added to or modified by the user.

Reference should be made to IBM System/360 Principles of Operation form A22-6821, for a description of a computer system which could be monitored by the apparatus disclosed herein.

U.S. patent application Ser. No. 609,073, Memory System, by Lindquist et al., filed Jan. 13, 1967, now abandoned discloses an associative memory of the type which may be used herein.

DATA PATHS AND ROUTING CONTROL

Figure 1:
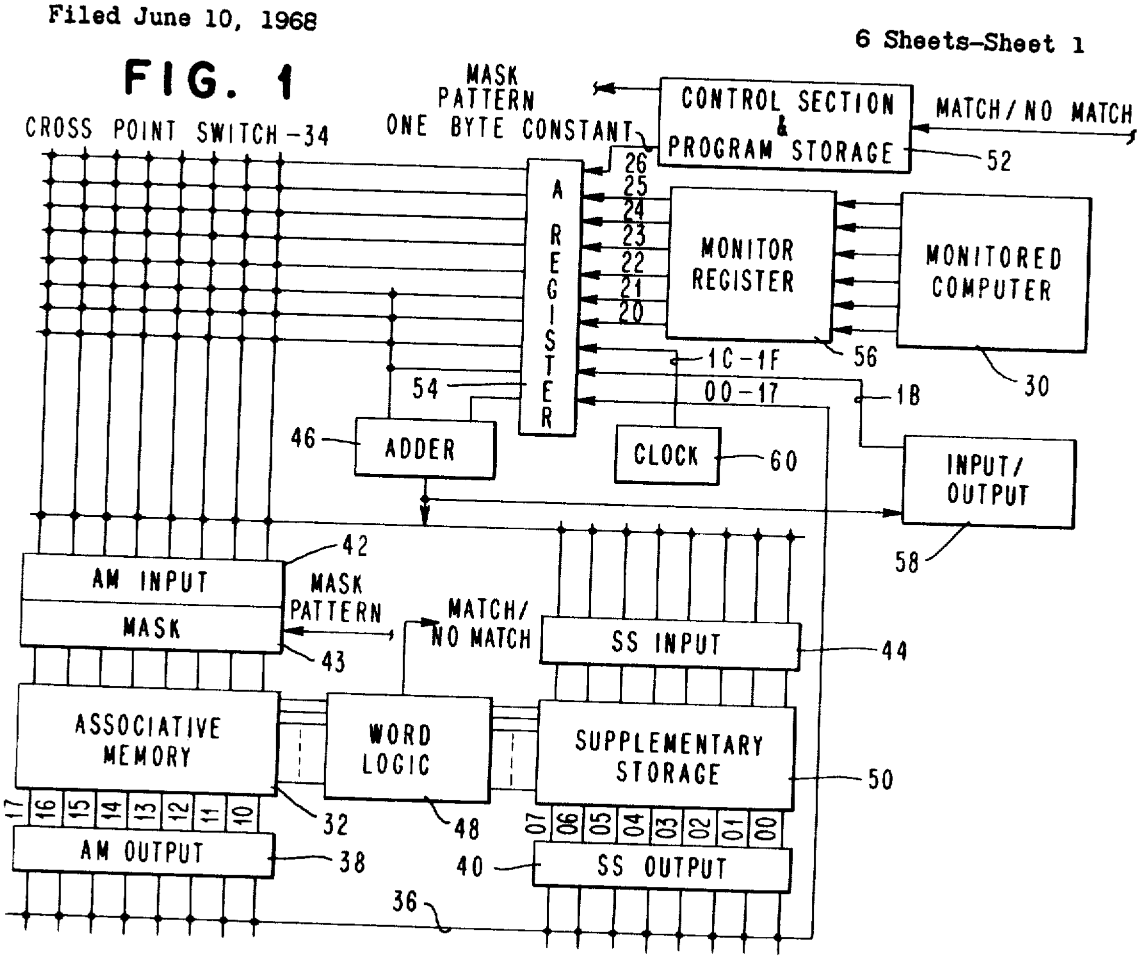
FIG. 1 is a simplified block diagram of a computer monitoring system in which the invention is embodied.

FIG. 1 is a block diagram of the data registers and paths of the monitor. Each line represents a path for one byte (8 bits) of data, and a dot where two lines cross indicates a programmable connection. One group of six paths (48 bits) carries monitored data from the interface with the host computer 30 to the input of the associative memory 32. The various registers and the cross bar switch 34 provide buffering and field control over these data. Another path 36, one byte wide, connects memory outputs 38 and 40 memory inputs 42 and 44 through an adder 46 to allow internal processing functions.

The world logic circuits 48 link the supplementary storage 50 with the associative memory 32 and provide an addressing function for the two memories. This addressing function is carried out when the associative memory is interrogated with data at its input register 42. If the data in any associatvie word cell compare equally with the interrogating data, either that word cell, or a word cell in supplementary storage 50 in one-to-one correspondence with it, or both may be selected for the entry or recovery of data. Explicit addresses for these word cells are not needed in the program instructions. The word logic circuits 48 also provide other functions, including tie-breaking in the case of multiple matches and a match/no-match signal for conditioning branching in the program.

Figure 7A:
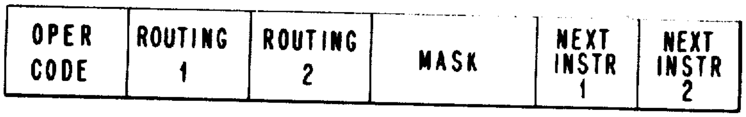
FIG. 7*a* is a diagram of the associative memory instruction format.

Control over the data routing is accomplished within an instruction obtained from Program Store 52 by means of routing specifications. The standard instruction format is shown in FIG. 7*a*.

The operation code for the AM instruction specifies one of the following:

INTERROGATE—compare contents of input register 42 with all stored words and turn on match indicators for cells with equal contents.

INTERROGATE NEXT—same as above, except that the match indicator for the next cell is turned on.

WRITE—store the contents of the input register into all cells whose match indicators are on.

WRITE NEW—store the contents of the input register in the first vacant word cell.

WRITE ONE—store the contents of the input register in the first cell whose match indicator is on.

WRITE ALL—store the contents of the input register in all cells regardless of the match indicators.

READ—put the contents of the first cell whose match indicator is on into the output register 38.

Two fields of data may be moved simultaneously by means of the two routing specificaions: routing 1, routing 2. These fields may be one, two, or three bytes in length, or, alternatively, a literal constant of one byte may be substituted for one of the routing specifications.

The routing specification in the standard format contains 16 bits, identified as follows:

*Change Code* (one bit). A zero indicates that the A Register 54 is to be left unchanged, a one causes the field specified by the source address (described below) to be entered into the A Register before being routed further.

*Literal Code* (one bit). A one causes a one byte constant from the instruction to be entered into the A Register before being routed further. This constant replaces the field length and source address specification.

*Length Field* (three bits). Specifies the number of bytes of the field being routed. The maximum field length from the monitor register 56 is three bytes, and from other sources, seven. A length of zero causes no transfer of data.

*Source Address* (six bits). Specifies the location at which the lowest-order byte of the field to be routed is to be found. Successive bytes of the same field are moved in accordance with the length specification.

*Terminus Address* (five bits). Specifies the location to which the lowest-order byte of the field is to be routed. Addresses are tabulated below and are labelled accordingly on FIG. 1.

Sources

| | |
|---|---|
| Supp. Store Output | **00–07** |
| Assoc. Mem. Output | **10–17** |
| Void | **1A** |
| I/O Input | **1B** |
| Clock | **1C–1F** |
| Monitor Interface | **20–25** |
| Constant | **26** |

Termini

| | |
|---|---|
| Supp. Store Input | **00–07** |
| Assoc. Mem. Input | **10–17** |
| Void | **1A** |
| I/O Output | **1B** |

Addresses are given in hexadecimal. The address for the constant is not used when the constant is specified as a literal, but if the value of the constant is unchanged, the constant may be routed either alone as a one-byte field, or as part of a two- or three-byte field at addresses 25 or 24. If a void is specified as a source, the corresponding terminus is reset to zeros. If a void is specified as a terminus, positions of the A Register corresponding to the source are reset to their new values.

The two routing specifications per instruction permit two fields to be moved simultaneously and in parallel from the monitor register interface to the associative memory input register 42 via the A Register 54 and the cross-point switch 34. Transfers of data from sources other than the monitor register take place over a bus 1B which is one byte wide, and are therefore serially by byte. As a result, only one such transfer can be called for in each instruction, using the first routing specification. The second routing specification can be used, however, for a simultaneous transfer through the cross-point switch. A literal can be specified only with the second specification.

The "next instruction" specifications provide conditional branching to the program, based upon the collective condition of the match indicators. The choice of the next instruction depends on the following.

INTERROGATE:

| | |
|---|---|
| If single or multiple match | Instr. 1 |
| If no match | Instr. 2 |

WRITE or READ:

| | |
|---|---|
| If one or more MI's are on | Instr. 1 |
| If no MI's are one | Instr. 2 |

ASSOCIATIVE MEMORY

The associative memory 32 consists of a number of word registers which are accessible in parallel for interrogation or for the entry or retrieval of data. These registers are addressed by content, rather than by location, by means of the interrogation in which the entire array of word registers is compared simultaneously with the input register 42. A match indicator 48 is turned on for each of the word registers whose content is equal to that of the input register. In general, only certain fields will be used in the interrogation, the remaining bit positions being ignored by putting zeroes in the corresponding positions of the Mask register 43.

As a result of interrogation, Match Indicators (MI) are turned on for all words whose unmasked bit values are the same as the bit values in the input register. This may result in several words being matched at one time, and, if desired, data may be entered into all simultaneously by causing the MI's to condition the word registers for writing. The unmasked contents of the input register are stored in all word registers so selected.

For retrieval, and for another type of entry, only one word can be selected at a time even though several MI's have been turned on. For this purpose, another type of conditioning for reading or writing allows just one of the turned-on MI's to selected a word for the operation. That one MI can be turned off in the operation without affecting other MI's, so that a succession of read or write operations can progress through the matched words.

Another form of selection logic is also employed: instead of selecting the same words that have been matched, the MI's are used to select the next words in physical order. This facility allows groups of words to be treated as ordered sets more conveniently than with same-word match/select correspondence.

Several interrogations may be made in succession without resetting the MI's. This adds an OR function to the selection of words, in addition to the AND function which normal use of the input and Mask registers provides.

Other functions are performed with the aid of status bits which are actually contained in the associative word. One of these, in general use, is the vacancy bit, which distinguishes word registers containing valid data from those which are available for the storage of new information. Other status bits can be set up to indicate such qualifications as the last word stored, or the next words to be interrogated. Operations in which status bits appear are prepared by using constant bit patterns in the Input and Mask registers.

SUPPLEMENTARY STORAGE

Supplementary storage (SS) 50 is used to retain times, counts, and condition codes for which associative processing is not required. However, each word cell of supplementary storage 50 corresponds to a unique word cell of associative memory (AM) 32 and may be selected whenever an interrogation of assocative memory turns on a match indicator (not shown, but located in Word Logic 48) for the corresponding AM cell. The general concept is that the AM word cell retains data describing the state of the monitored computer 30, while the SS word cell collects the statistics relative to that state.

The character of the monitor's algorithms is such that there are a series of operations involving associative memory only, establishing or identifying a record for the monitored computer's state. This process will usually be completed only when the computer has assumed a new state, but a match indicator will be on, pointing to the record of the previous state. If the algorithm provides an SS instruction at this time, the SS word cell is selected and updated according to the SS instruction. Once the selection has been made, it is not affected by any alteration of the match indicators until the SS instruction is completed and another one issued.

The updating is accomplished through the adder 46 and the SS input and output registers 44 and 40. It is possible for AM and SS operations to proceed independently once the selection of an SS word cell has been made. This overlap takes place automatically for all AM instructions except those which call for the transfer of data between associative memory and supplementary storage or to the input/output (I/O) 58.

Figure 6:
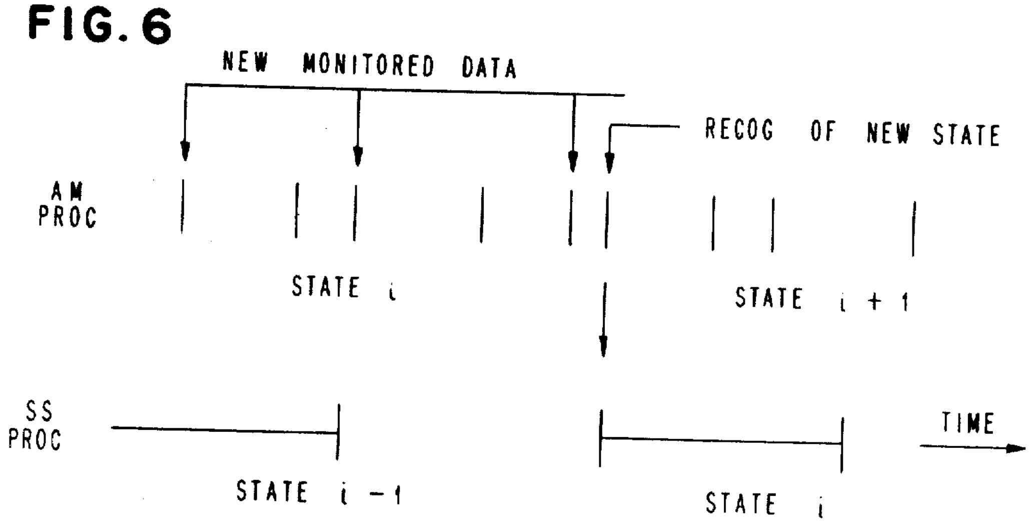
FIG. 6 is a timing chart illustrating the overlapped operation of supplementary storage and associative memory processing.

The overlapped processing is illustrated in FIG. 6. The time at which the monitored computer assumes a new state *i* is taken to be the time of receipt of new monitored data, as indicated by the appropriate strobe signal from the computer. Since there is generally a lag of one cycle before the new state is recognized, the clock 60 is buffered so that it may be reset to record a new time period starting from the strobe while the old time period is retained pending use in the SS instruction. If no new state has occurred, the old and new time periods are combined.

Figure 7B:
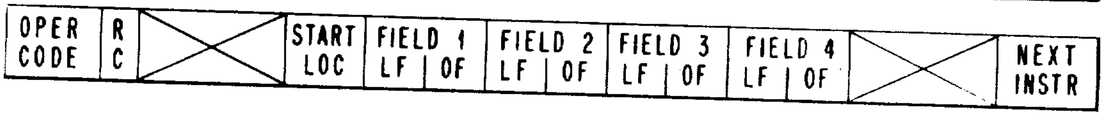
FIG. 7*b* is a diagram of the supplementary storage instruction format.

The updating of a word in supplementary storage is controlled by a single instruction (see FIG. 7*b*) containing specifications for performing different operations on four fields of the word. These fields may be from one to seven bytes in length individually, the combined length not exceeding the sixteen bytes of the SS word. The SS instruction occupies program storage as part of the programmed algorithm, but it differs in format from the AM instruction.

The starting location specifies the low-order byte of field 1, which is updated according to its length and operation specification. The remaining fields are contiguous in the SS word, and are processed in succession. If the entire sixteen bytes of the word are not utilized in an application, the starting location may be other than zero, and the time of completion of the SS instruction will be lessened.

In addition to length of field (LF), the field specification may call for one of the following operations on field (OF):

(1) Increment field
(2) Add clock to field
(3) Put the lesser of the clock reading and the old field value in field
(4) Put the greater of the clock reading and the oil field value in field
(5) OR the interface byte to the field
(6) No operation

BASIC OPERATION OF THE SYSTEM

In measuring the performance of a computer it is often necessary to know how much time is spent in executing programs taken out of various areas of main storage. To determine these times a counter must be assigned to each of the active areas. When an instruction is fetched from an area of computer storage, clock pulses begin incrementing the assigned counter and continue until an instruction is brought from some different area.

In the present system, the counters are located in supplementary storage 50 and are assigned to main storage areas automatically, through an associative memory matching technique. Initially the associative memory 32 is empty and the counters stand in storage 50 at zero. The first instruction address is transferred from the computer's storage address register across the monitor interface through monitor register 56, A register 54, and cross-point 34 to the associative memory input register 42. This instruction address is stored in an associative memory word location as illustrated in FIG. 2.

Figure 2:
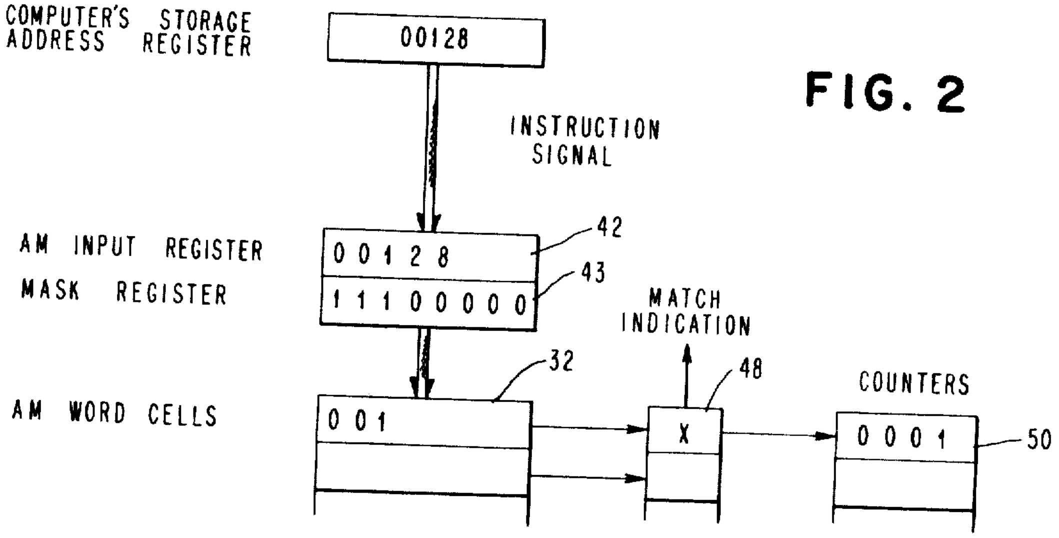
FIG. 2 is a block diagram illustration of the assignment of a counter to the initial execution area.

In the illustration of FIG. 2 this word becomes responsible for monitoring the storage area 00100 through 001FF. This function is performed by the inherent comparing capability of the associative memory which compares the AM word cells contents with each new instruction address brought into the associative memory input register 42. The lower order bits are ignored by means of masking with the mask register 43. As long as there is equality in the high order bits (001) of the address a match is indicated and the match indicator 48 for that cell selects a corresponding counter in supplementary storage 50 allowing it to accumulate a count by being stepped in accordance with a basic timing interval (clock 60).

The process of interrogation is repeated until an inequality between the value stored in the cell and a monitored instruction address produces a mismatch. The mismatch signals that program execution in computer 30 has moved to a different area of the computer's main storage. In response to the mismatch indication the counter 50 is disenergized causing the controlling program 52 to branch to a write cycle in order to record a new active area as illustrated by the flow diagram of FIG. 3*a*.

Figure 3A:
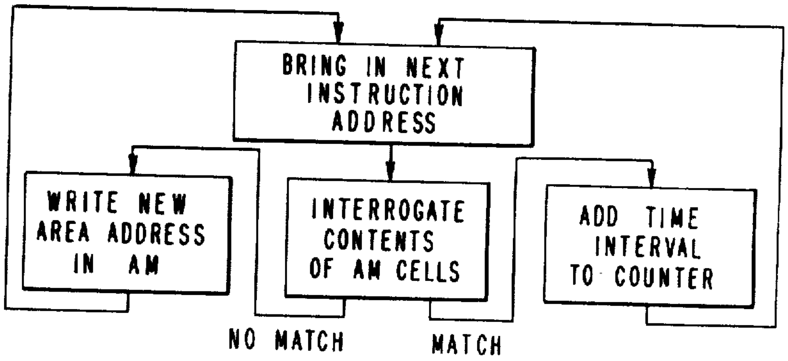
Figure 3B:
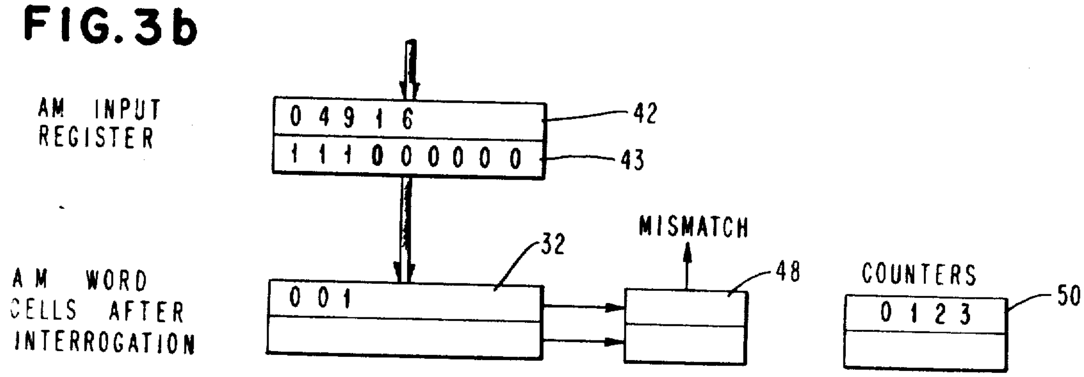
Figure 3B:
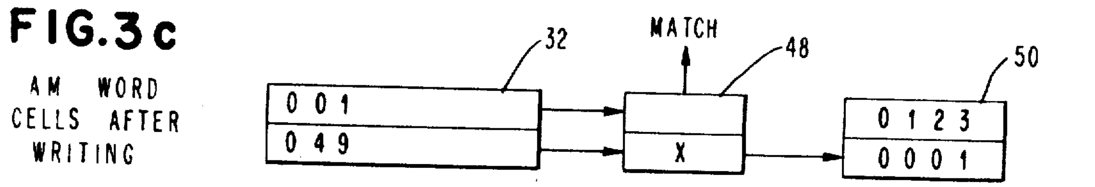

As illustrated in FIG. 3*a* the monitor program assigns counters as they are needed and records their assignment in the associative word cells. For example, in FIG. 3*b*, a new area address 049 is monitored, causing a mismatch. The monitor program branches (FIG. 3*a*) and writes the address 049 into associative memory 32, thus assigning a new counter in Supplementary Storage 50 to the new area. The AM word cell after this operation is illustrated by FIG. 3*c*. If in executing its program the monitored computer reverts to an area already identified by the program monitor, such as 001 in the example of FIG. 2, the original AM word cell matches the address and the counter is reactivated for additional accumulations.

Figure 4:
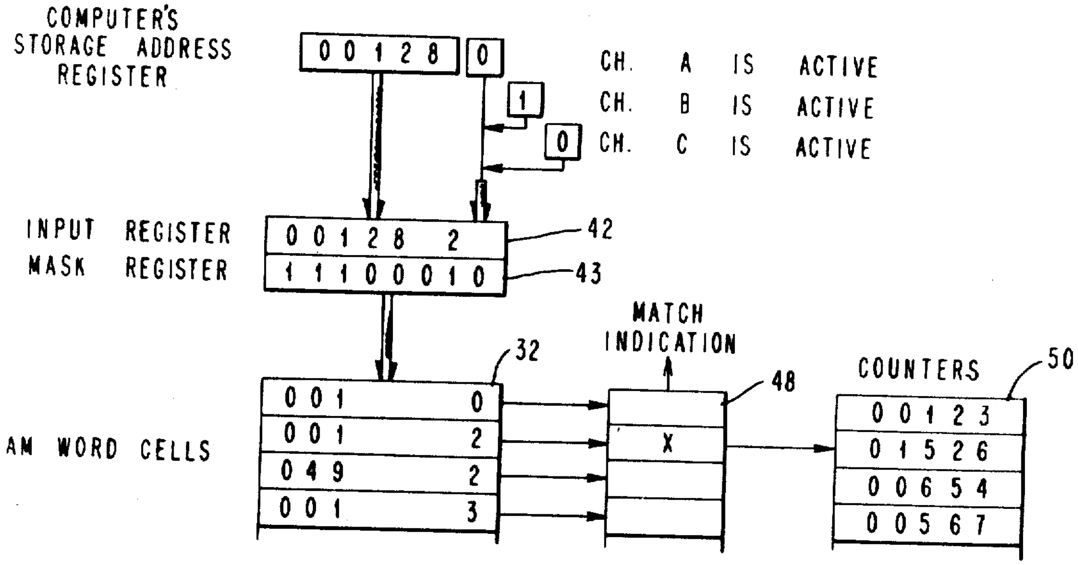
FIG. 4 is a block diagram illustration of the correlation of executed area with channel activity.

The two-branch monitoring procedure illustrated by FIG. 3*a* is utilized to yield many kinds of information. As shown in FIG. 4 channel activity (Input/Output 58) is monitored and presented at the interface as a field of bits (channel B identified by address 2). This field is juxtaposed with the computer's storage address as shown in FIG. 4. Thus, a correlation is made automatically between storage usage and channel activity. It is immaterial to the monitor what kind of data is brought to its interface. Therefore the user can perform the correlations on any combinations of events which are represented by digital signals.

Figure 5:
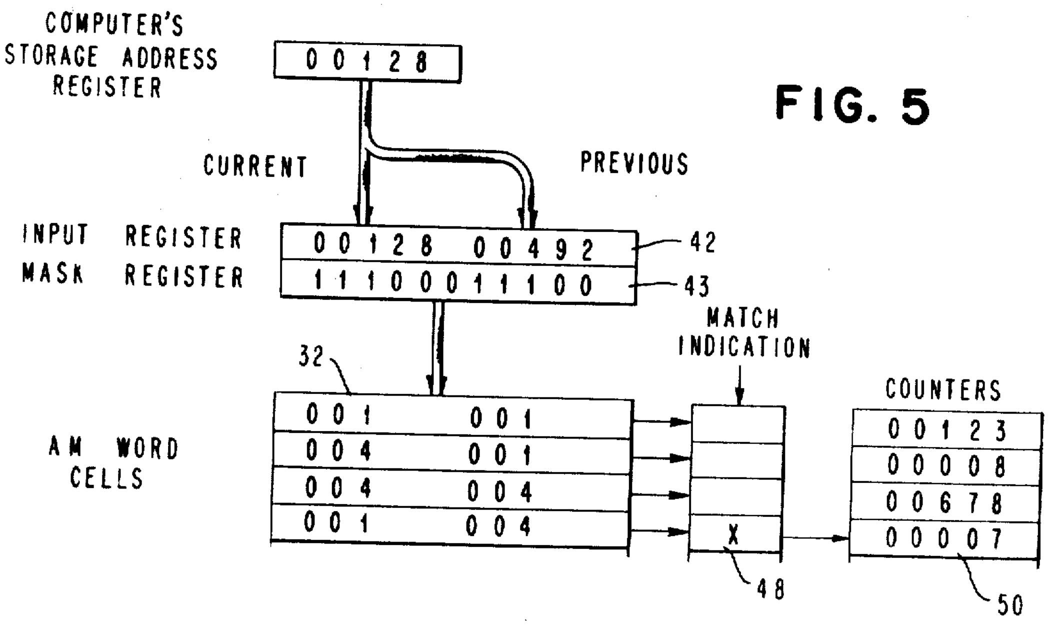
FIG. 5 is a block diagram illustration of the recording of occupancy and transistions of execution areas.

Another example of a correlation is shown in FIG. 5. This correlation yields information about the sequence of events taking place in the monitored system. Each event is related to its predecessor by forming an ordered pair at the associative memory input register. Two kinds of events are recorded in this process: the occupancy of a particular area and the transition from one area to another. The address is first placed into the left hand field (the current field) of AM input register 42 and an interrogation of the associative memory is performed with the current address and the previous address. After the match indication has been utilized, the address is then put into the right hand field (the previous field) and is retained there until the next address arrives and the cycle is repeated.

A typical operation shown in FIG. 5 might involve two memory areas of sequential addresses beginning with the address 001 for the first area and 004 for the second area. Each area would, of course, involve a series of addresses. Following through the example, it is assumed that the first memory area 001 is utilized by the monitored system. The first address is brought from the computer storage address register and placed in the input register 42 of the associative memory. Since this is the first address reference, it is not necessary to interrogate the associative memory which, in the beginning, would have nothing stored in it. Therefore, this first address can be immediately placed in the right hand portion of the input register, the previous address segment of that register. Assuming that the next address referenced is also in the area 001, this address is brought out and put into the current portion of the input register 42. The associative memory is then interrogated and since there is nothing in the associative memory, a write cycle is taken to store the contents of the input register, i.e. 001 001. (The insignificant portions of each address are masked out by the mask register 43.)

At the end of the write operation, the previous address is discarded and the current address is shifted from the input register to the previous address portion on the right. The next address is brought from the computer address storage register and placed in the current or left most portion of the input register 42. Assuming that the next address is also from the area 001, a match occurs in the associative memory turning on the match indication for that word. The counter associated with the matched word is incremented so that it now reads 2, the number of references which have been made to the memory area 001.

The input register is shifted to the right so that the current address is placed into the previous address portion and the previous address is discarded.

Now assume that the monitored program has made a transition from one area, 001, to another area, 004. The contents of the storage address register which now contains the digits 004 are transferred to the current portion of the input register 42. The input register now contains the address beginning with 004 in the current portion and the address beginning with 001 in the previous portion. The associative memory word cells are interrogated and no match occurs because this word is not stored in the associative memory. (The only word that is stored at this point is 001 001.)

A write cycle is taken and the contents of the input register are stored in an available associative memory word cell and the counter corresponding to that word is incremented by one. The contents of the current portion of the input register are now placed into the previous portion and the previous portion is discarded.

If references are made to the storage area 004, they will be recorded as previously described with respect to the area 001 resulting in the third word stored in the associative memory, i.e. 004 004, and the corresponding counter will be incremented. The address in the current portion of the input register is now placed in the previous portion.

Assume now that the program being monitored reverts back to the area 001. The contents of the storage address register (001) are placed into the current portion of the input register 42. The input register now contains 001 004. Since no match occurs, the contents of the input register are placed into the associative memory word cell and the counter associated with that cell is incremented by one. The current address is shifted to the previous address in the input register 42. If the next address is also in the 001 area no transition occurs. The storage address register contents are placed into the current address portion of the input register. The input register therefore now contains 001 001. An interrogation causes a match with the first associative memory word cell (001 001) and the corresponding counter is incremented.

Further transitions from the area 001 to the area 004 will result in a match in the second associative memory word cell and the appropriate counter is incremented.

The statistics shown registered in FIG. 5 indicate that activity transferred between two memory areas, 001 and 004; that 8 transfers were made from area 001 to 004; that 7 transfers were made from area 004 to 001; 123 references were made to addresses within area 001; and 678 references were made to addresses within area 004.

This procedure develops a graph of the systems operation in the associative memory, and is used to study the operation of paging algorithms. If the full instruction address is applied to the associative memory by modifying the mask register's contents, all the linkages of a program are recorded and are used to draw the program block diagram as it is actually executed. This technique is wasteful of space and is impractical except for very small programs. A more complex procedure described below eliminates much of the redundant information and makes block diagramming feasible with associative memories.

The foregoing described logic recording capabilities of the program monitor. Usage recording functions take place in the counters which are actually word cells in the supplementary storage addressed by the associative memory as a result of the interrogation process. These word cells are set up in various ways to record counts, times, or the presence of computer conditions, according to the particular measurements desired.

APPLICATION EXAMPLES

In the application examples to follow, the algorithms are given as block diagrams, in which each block represents one instruction including data routing, the operation (write or interrogate), and the masking for AM operations. Data are routed by fields, which are constant within each application and are designated by capital letters, generally mnemonic with their meaning. The location of a field is indicated by a subscript identifying the register involved in the routing or the memory itself. These subscripts are:

*b*—monitor register 56
*a*—cross-point entry register (A register 54)
*i*—associative memory input register 42
*s*—storage cells of associative memory
*o*—output register 38 from associative memory
*p*—input/output registers 40, 44 of supplementary storage The various fields used in an algorithm form an ordered set at the input to the associative memory and after being written into a particular word cell. The notation for such an ordered set is:

$<S_sP_sC_s>$ for a particular stored word.

Where S is the field combining program status and busy channel bits (6 bits); P is the page of instruction (8 bits); and C is the last state indicator.

If interrogation is to be performed, it is generally on a set of such words. This set is not ordered and is written as follows:

$$<S_sP_s—>$$

In this example, S and P identify the fields active in the interrogation, and the dash indicates that the field occupying that relative location in the word is masked.

Application 1: Combinations of events and states

*Problem.*—To find out what system states occur over a period of operation of a computer system, how many times each state occurs, and how much time is spent in each state. For this application, a system state is defined to be one combination within the following classes of monitored signals:

| | | |
|---|---|---|
| Stopped/operating | 2 possibilities | 1 bit. |
| Running/waiting | do | Do. |
| Supervisor/problem | do | Do. |
| Channels busy | 8 possibilities | 3 bits. |
| Page of instruction | 256 possibilities | 8 bits. |

The interface between computer 30 and monitor register 56 is set up to provide all of the above signals (except page of instruction) on an on-off basis. The page of instruction is the high-order 8-bit group of the instruction address, whose presence at the interface is signaled by means of the instruction strobe. An evaluation of the system state is to take place at each instruction strobe, or, if instructions are not being executed, at each change in the remaining conditions.

*Procedure.*—Each system state is represented by a particular bit pattern in the above array of 14 bits, and is recorded in one word of associative memory. The time interval and usage of each state is totaled in the corresponding word of supplementary storage. If instructions are being executed (operating and running program states), the entire bit pattern is used, otherwise only program and channel statuses are stored.

Whenever a change of state occurs, the appropriate bit pattern is compared simultaneously against all those previously stored in associative memory 32. If no match is found, indicating a new state, the new bit pattern is stored in the next vacant word location, and the corresponding statistical fields in supplementary storage are initialized. If a match is found, indicating a repetition, the corresponding statistics are updated.

Interrogations of associative memory may occur as a result of instruction strobes without a change from the state of the previous interrogation. To detect changes, a control bit is added to the array of 14 bits and is set to one in the word representing the current state of the system.

*Results.*—At the end of the evaluation, there will be stored in associative memory one word of data for each different system state which has actually occurred. These can then be printed out using the ordered retrieval procedure to present the nonexecuting state first, then the states in page order.

Figure 8:
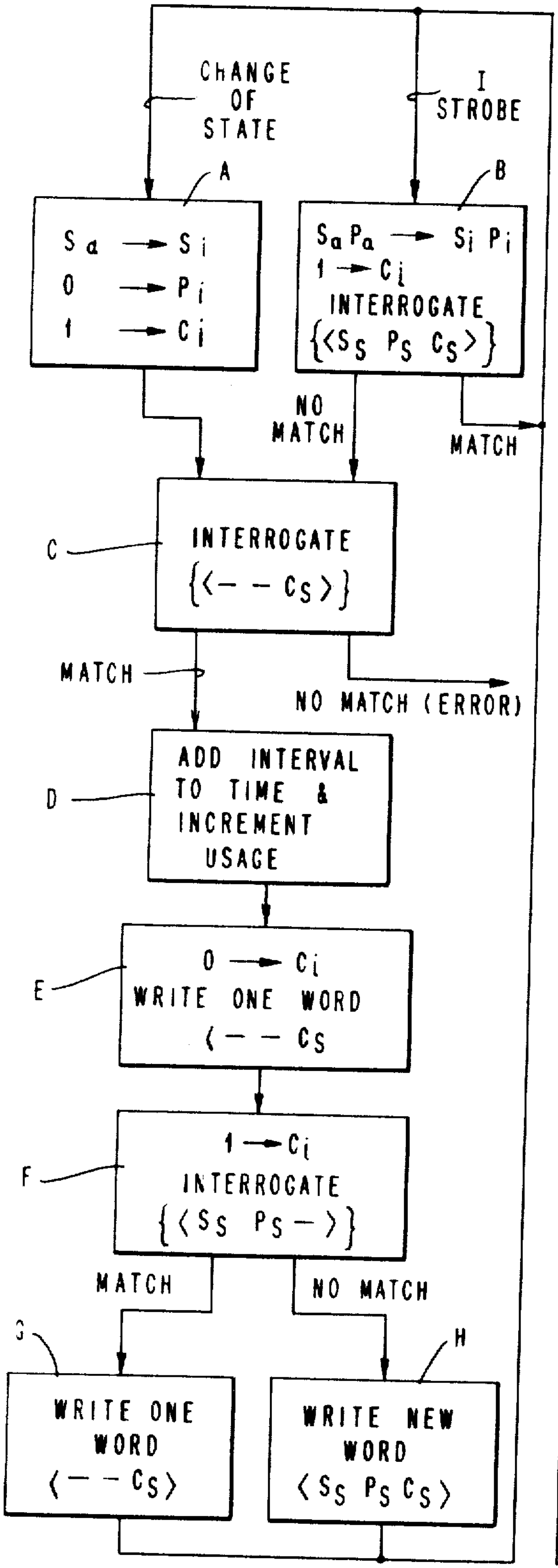
FIG. 8 is a flow chart of an algorithm for combinations of events and states.

Algorithm for combinations of events and states (FIG. 8)

S—Field combining program status and busy channels bits (6 bits total)
P—Page of instruction (8 bits)
C—Last state indicator
Fields in storage:

$<S_sP_sC_s>_{associative}$
$<time+usage>_{supplementary}$

Referring to FIG. 8, when an instruction strobe (I strobe) initiates a cycle (step B), the monitored bits are routed through the A register 54 (FIG. 1) to the AM input register 42 for interrogation of the associative memory 32. A match indicates no change of system state and completes the cycle.

If instructions are not being executed, the change of program or channel status (change of state) starts the cycle, (FIG. 8 step A) in which only S bits are taken from the Monitor register 56 and zeros are put into the P field of the AM input register 42.

Before the new state is recorded, the time (recorded by clock 60) in the last state must be added to the total for that state (in storage 50) and the usage incremented. This is accomplished by interrogating the associative memory with the last state indicator $C_s$ in order to select the last word recorded and thus the corresponding word in supplementary storage (FIG. B, step C, D).

After resetting the last state indicator by writing a "0" in the $C_s$ field (step E), an interrogation (step F) is made with the P and S fields still in the AM input register to determine if the current system state is one which has been previously recorded. If it has (step G), only the last state indicator is stored in preparation for the next cycle; otherwise (step H), the entire contents of the AM input register are written into the next vacant word to record the new state.

Application 2: Distribution of events

*Problem.*—The path length between branches taken may be defined as the number of sequential instructions executed before a branch to a nonsequential address. It is important in determining how far a computer ought to look ahead in its instruction fetches. This application determines what path lengths actually occur in programs and how frequently each occurs. The distributions are to be found for paths preceding each type of branch instruction.

The signals supplied to the monitor register are the operation code, a bit indicating whether the branch was taken, and an instruction strobe. If the bit for "branch taken" were not available, then the address and length of instruction could be used to make an arithmetic check for non-sequential instructions.

*Procedure.*—The associative memory is preloaded with the set of operation codes of the branch instructions, one word for each code. These words also contain a one in a single-bit field to indicate "branch taken," and a path length field containing zero. A frequency field in supplementary storage is provided to indicate the number of times the same path length is encountered. In addition, a specially marked word is set aside in the associative memory for the running count (in supplementary storage) which is initially zero.

As each operation code and "branch taken" bit is brought in to the monitor register, the combination of these two fields is compared against the preloaded set of codes. If no match is found, the running count field is incremented by one. If a match is found, the running count field is routed to the path length field, unmasked, and a second interrogation made. If this also results in a match, the frequency field of the matched word is incremented;

otherwise, the new path length is stored in a vacant word with an initial frequency of one. The running count field is reset to zero.

*Results.*—At the end of the run, there will be one word stored in associative memory for each path length and operation code. These can then be printed out using the range retrieval procedure to condense the different path lengths into groups.

Figure 9:
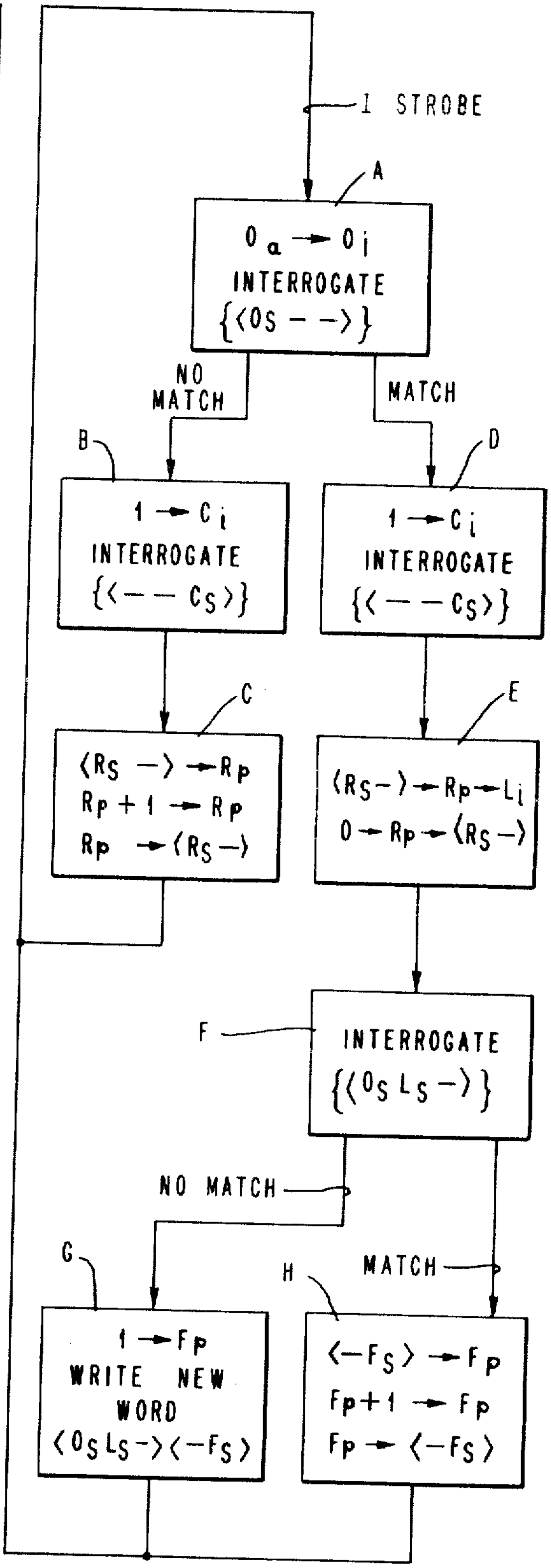
FIG. 9 is a flow chart of an algorithm for finding distributions of events.

Algorithm for finding distributions of events (FIG. 9)

O—Operation code and "branch taken" bit (preloaded set of branch codes with L=0)
L—Length of path
C—Code for running count word
R—Running count
F—Frequency
Fields in storage:

$\langle O_S L_S C_S \rangle_{\text{associative}}$ $\langle R_s F_s \rangle_{\text{supplementary}}$ Each instruction strobe (I strobe) initiates a test (FIG. 9, step A) to find if a branch was taken for one of the prespecified operation codes. These need not be the entire set of the host computer.

If no actual branch is found (no match), the running count is incremented by selecting the word where it is stored with an interrogation for its code (step B). The running count field is read out of supplementary storage, routed through the incrementer, and re-stored in the same word (step C).

If the branch has taken place (match), the running count is selected (step D), and routed into the AM input register where it becomes the path length (step E). The running count field is then reset (step E). The combination of operation code and path length then is either stored (step G), or if already in storage, causes an increment to be made to its frequency field (step H).

Application 3: Short sequences and mixes

*Problem.*—Knowledge of instruction mixes can be an important factor in the planning of new systems. There are a number of ways in which the collection of mix data can be specified, all involving some form of sequence-following or finding. In this example, the problem is to find what operation codes immediately precede the conditional branch types of instruction, up to a maximum of ten including the branch.

*Procedure.*—One word of associative memory is used for each mix, with the operation codes distributed across the word in ten fields of one byte each. As operation codes arrive at the monitor register they are rounted to successive fields in the AM input register and also to a field set aside for comparison against the set of conditional branch codes which occupy a special set of preloaded words. When one of these codes is found, the array of ten fields in the AM input register is used to interrogate the rest of associative memory which holds the arrays already found, and the appropriate entry of updating of usage is performed. The AM input register is reset to zeroes, and the next operation code starts a new sequence.

The sequence may go beyond nine codes before a conditional branch is found. In that case, the eleventh code takes the place of the first, and so on until a conditional branch is found.

*Results.*—Each word contains one mix of ten or fewer operation codes. The terminating conditional branch code may occupy any of the ten fields, but if there is at least one zero after it, the entire sequence is as recorded; if not, the preceding nine codes are read in "end-around" fashion.

Figure 10:
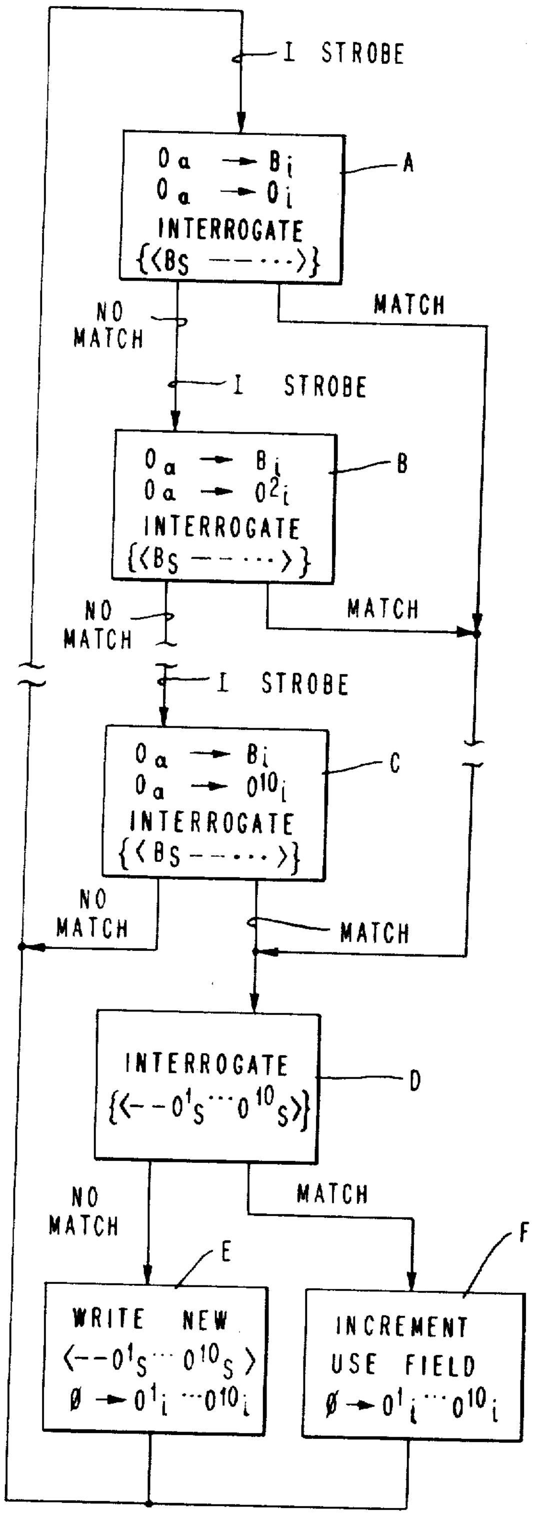
FIG. 10 is a flow chart of an algorithm for finding short sequences.

Algorithm for finding short sequences (FIG. 10)

O—Operation code received at monitor interface
B—Pre-stored branch operation codes
Fields in storage:

$\langle B_s 00000000000 \rangle$ set of branch codes $\langle 00 O^1{}_s O^2{}_s O^3{}_s B^4{}_s 000000 \rangle$ mix of four codes in sequence of four $\langle 00 O^{11}{}_s O^{12}{}_s O^{13}{}_s O^{14}{}_s O^{15}{}_s O^{16}{}_s O^7{}_s O^8{}_s O^9{}_s O^{10}{}_s \rangle$ mix of ten codes in sequence of at least sixteen Successive operation codes are placed in successive O fields across the AM input register by means of a string of microinstructions differing only in the routing microinstruction. (FIG. 10, steps A, B . . . C). When a branch operation code is received, a common routine (step D) is followed to add the new mix to storage (step E) or increment of the usage field of an existing mix (step F).

Application 4: Long sequences

*Problem.*—One way of determining the performance of a system is to see how often prespecified sequences of events occur. In this example an operating system (see above-identified IBM System/360 Principles of Operation) is to be tested with a known load to determine if predicted sequences of supervisor calls, interrupts, and object programs are being followed. The sequences may be very long, may overlap or include each other, and may start or end with any arbitrary element.

The change to a new current PSW (program status word) represents a step in the sequence, and can be detected by the fact that there is an interruption in the host system or that a LOAD PSW instruction is executed. The address of the PSW identifies the sequence element and is obtained from the monitor interface whenever a change occurs.

*Procedure.*—The associated memory is preloaded with the sequences to be followed, the elements of each sequence being placed in successive memory words. In the word the code for each element occupies one field, in this case 24 bits of address. The word also contains two single-bit fields, one of which contains a one for the start and the other a one to indicate the end element.

This procedure makes use of a special interrogation operation for associative memory in which, when a word is matched, the next succeeding word in physical order is selected for the entry of data. In this case, a status bit is entered in the word after interrogation in order to keep track of progress through the sequence, and the critical interrogation is made simultaneously on the address and status bit. If the interrogation is successful after the next element has been received, the status bit is moved to the next word.

In addition to recording successes in traversing complete sequences, statistics can be compiled on partial traverses in the words of supplementary storage corresponding to intermediate sequence elements.

*Results.*—At the end of the test, the associative memory contains the sequences tested for, and supplementary storage contains the record of how well these sequences were followed. The sequences can then be printed as a complete test record in a format permitting an item by item comparison with results of tests of variations of load or system.

Figure 11:
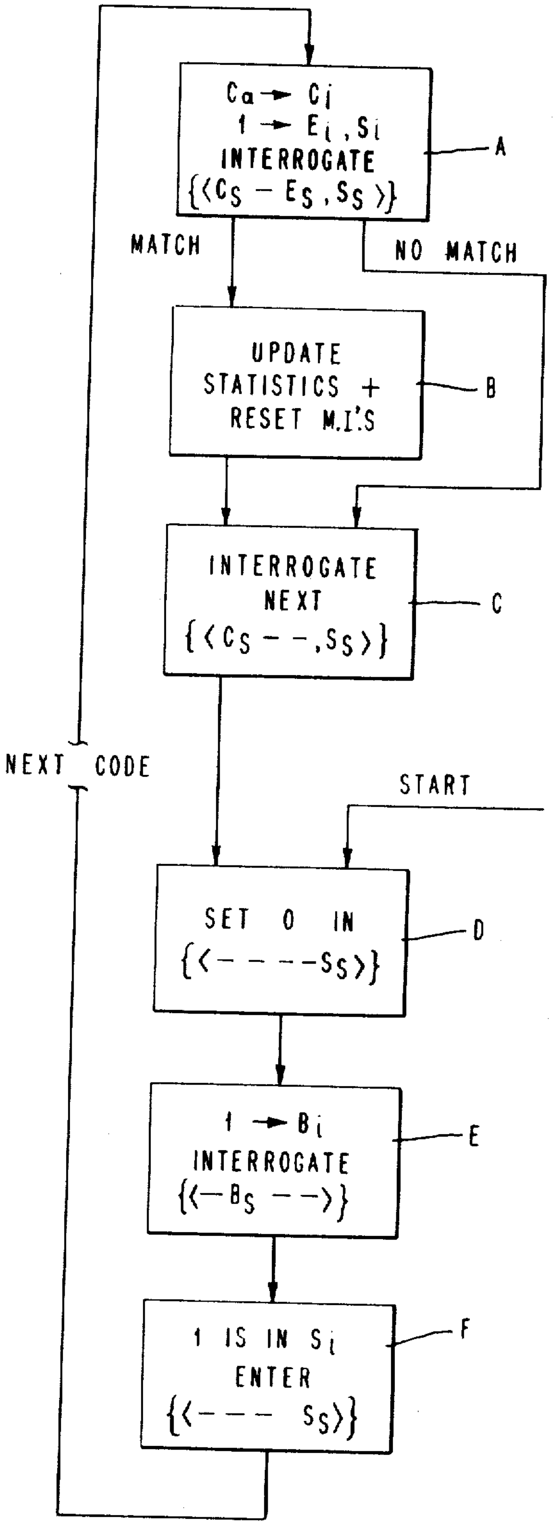
FIG. 11 is a flow chart of an algorithm for following long sequences.

Algorithm for following long sequences (FIG. 11)

C—Code for sequence element
B, E—Start and end
S—Status bit

Initially, and at the end of each cycle, (step F) the status bits are set to one for all first elements.

When the next code is received from the monitor register, an interrogation (step A) is first made to find out if that code matches any expected last elements of sequences so far successfully followed. If so, (step B) the statistics are updated and that element is reset to zero status (without affecting other elements in that sequence).

The same code then is used (step C) to interrogate the set of all elements whose status bit is one. This operation uses the INTERROGATE NEXT operation (described under "Data Paths and Routing Controls" above) to prepare for the eventual entry of a one in the status bit of the next word.

Zeros are then set into all status bits (step D), regardless of the match indicators, and without resetting them. This step clears any elements which may not have been matched with this last code.

Finally, all first elements are selected (step E) for entry by the use of a normal interrogate operation. This selection is OR'd with the selection obtained by the INTERROGATE NEXT operation above. Status bits are set to 1 (step F) in all selected words, i.e. all first elements and the word selected by the INTERROGATE NEXT operation.

Application 5: Block diagramming

*Problem.*—In debugging or in evaluating the performance of a program it is important to know whether program segments are executed in the proper order, how much time is spent in each segment, how well they were overlapped with channel activity, and if execution was forced to wait. Although one or a few segments might be singled out for examination by methods similar to those of the preceding applications, there is difficulty in predicting where and what to look for, and a chance of missing something significant.

If every instruction address were paired with its successor in the instruction stream and the combination applied to associative memory, eventually the memory would contain all the links between instructions for that program. However, most instructions have unique successors, and the technique would waste memory space on redundant information. The essential information is contained in just those linkages from or to instructions which have several successors or predecessors. These linkages can be identified from addresses and operation code in the instruction stream.

*Procedure.*—Each word of associative memory contains three address fields, the "entry," "exit," and "destination." The entry and exit addresses are the first and last of a block of sequential instructions, and the destination is the entry of a succeeding block, so that each stored word represents one linkage in the logical structure of the program.

Certain addresses are identified as exits when they occur in the instruction stream accompanied by a branch operation code. The first address after an exit is automatically an entry to a current block, which will occupy one of four possible relationships to blocks already found. As the entry and succeeding addresses appear in the instruction stream, they are compared with previously stored entries and exits to resolve whether the current block is new or one being retraced, or whether either the current block or an old block is to be partitioned.

As execution of the program proceeds, with repetitions of its segments, most of the linkages will be followed one or more times, and the corresponding division of the address stream into blocks will be established. When these elements are found or repeated, their time and usage is noted, and channel and wait statuses are correlated with them, using supplementary storage for this additional data.

*Results.*—It can be shown that each conditional branch instruction will result in at least two, and no more than four linkages, and that the number of blocks established by the branch is always one less than the number of linkages. Since one word of storage is required for each linkage, approximate 2700 blocks can be recorded in a 4096-word memory. Depending upon the complexity of the program's structure, the memory can cope with programs of between 6,000 and 16,000 instructions.

At the conclusion of a block diagramming evaluation, associative memory will contain the structural composition of the program according to its actual execution, and supplementary storage will contain the statistics correlated with each structure element. The standard presentation of this information would be a listing of the blocks with their exit linkages governing their order.

Once the information has been collected, other output procedures can be used to meet special requirements. For documentation of the program, it may be desirable to present the block diagram in pictorial form, using the host computer to compute and print the diagram. When the program is being optimized by trial, it will not always be necessary to print out the entire listing, but only the more time-consuming elements.

*Detailed description of procedure.*—If an instruction is a conditional branch, the first time its operation code is found in the instruction stream, it is recognized to have the potential for a different successor in some future execution, and therefore it is recorded as the "exit" of a block. Its successor of the moment is one "destination" and also an "entry" to another, or possibly the same, block. The basic record thus consists of three addresses, identifying the entry, exit, and one detination of the block.

Figure 12:
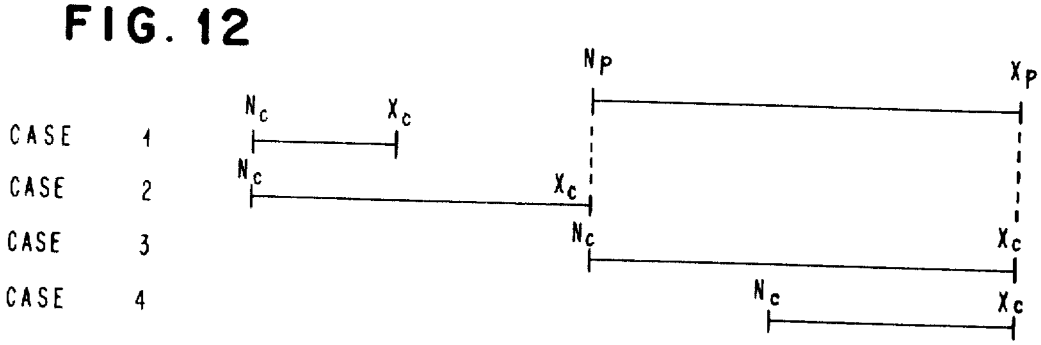
FIG. 12 is a timing chart illustrating the relationship of current blocks to blocks already traced out in a block diagramming algorithm.

When a conditional branch identifies the next address as an entry to a block, this block may intersect some block already derived from the instruction stream. There are four possible relationships of a current block to blocks already traced out, as shown in FIG. 12.

In case 1, none of the addresses from the current entry, $N_c$, through the current exit, $X_c$, will be found to match any previously stored entries or exits, $N_p$ or $X_p$; the block is therefore new and can be added to the store.

A current entry may not be recognized, but may be followed eventually by an address which does match some previously stored entry. The address just previous to that matching $N_p$ becomes the current exit of a block, as shown in case 2, and the block is recorded with $N_p$ as $<N_pX_p>$, because $X_c$ is not a branch.

The destination of a block may be to an entry already recorded, as shown in case 3. Assuming that no charge of operation code has taken place, the same exit must follow, and the block need not be recorded again unless the destination is different. Eventually, in the program's execution only case 3 will be found.

If a branch, conditional or unconditional, has led to a new entry within a block, as shown in case 4, this fact will not be known immediately. However, sooner or later an address will match the exit, $N_p$, to signal the condition. The current block can be added to the store, but the previous block is intersected by it.

In order to partition the intersected block discovered in this case, it is necessary to determine the address one location less than the current entry. This exit is not computable exactly when variable-length instructions are being executed, but it might occur again in the instruction stream and be recognized because its successor matches the entry in question. To cause this to occur, a flag is added to the intersected block, removing it from use by the algorithm, so that if the block should be repeated from its original entry, the situation will resolve itself into case 2.

The flagged block might include an initializing routine which is never repeated, and the block will contain time and status data which cannot be distributed to its partitions. Therefore, the flagged block is retained for the ultimate readout and presentation of results.

Special operations in the program, such as multiway branches, cause no difficulties to the operation of the algorithm when they are based on recognizable operation codes. If the program changes an operation code to a branch, as mentioned in case 3 above, the algorithm must be altered to take into account some cases in addition to the four cases described.

Figure 13:
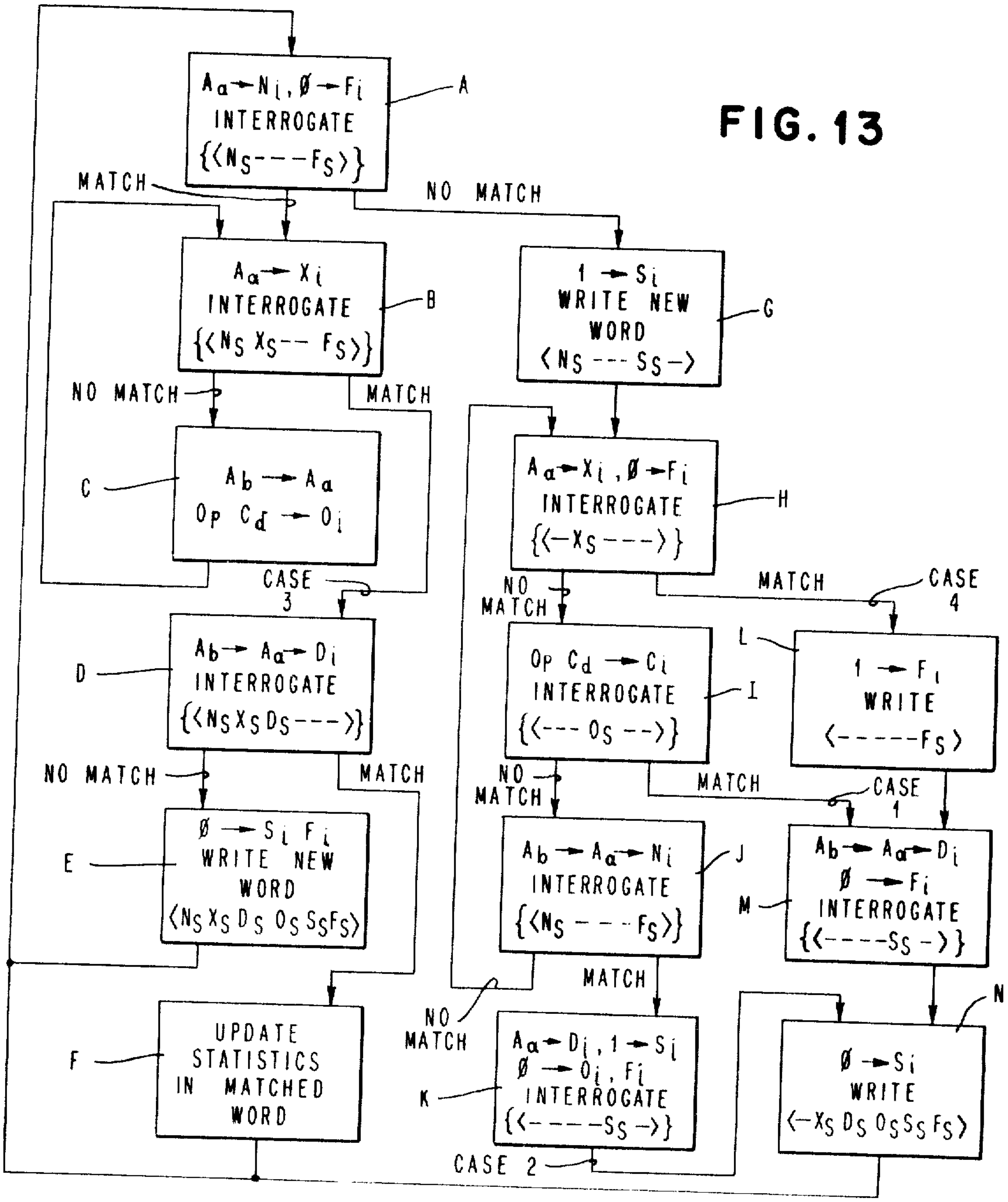
FIG. 13 is a flow chart of a block diagramming algorithm.

Block diagramming algorithm (FIG. 13)

A—Address
N—Entry address
X—Exit address
D—Destination address
O—Operation code
S—Status bit: 1 for new block
F—Flag bit 1 for intersected block (case 4)
Fields in storage:
<$N_sX_sD_sO_sS_sF_s$>$_{associative}$
<statistics>$_{supplementary}$ Referring now to FIG. 13 step A, initially an address $A_a$ in the A register is transferred to the entry field ($N_i$) of the input register along with a 0 in the flag field ($F_i$). Assuming that the interrogation results in a match, then the address is one that has been seen before as an entry address to a program sequence. This corresponds to case 3 of FIG. 12. In step B the same address $A_a$ which is stored in the A register is now routed through the cross-point switch to the exit address position $X_i$ in the interrogation register. An interrogation is performed on the entry ($N_s$) and exit ($X_s$) along with a flag bit ($F_s$). If a no match condition exists, the program routine now enters into a loop. The next address $A_b$ in the monitor register is transferred to the A register and the operation code is put into the operation code field ($O_i$) of the interrogate register and the program loops back to step B. This loop leaves the entry address alone and continues to search for the exit address by transferring subsequent addresses to the interrogation register until an exit address is found. Thus, the program is looking along the path of case 3 until it finds an exit address. When an exit address is found in step B a match condition occurs and the loop is broken, the program continuing on to step D. The next address after the exit address is a destination address and is transferred from the monitor register to the A register to the destination field of the interrogation register ($D_i$) as shown in step D. An interrogation is performed on the entry, exit and destination register fields. If a match occurs it shows that this block of the instructions goes to the same destination that a previous one did and the statistics are updated in the matched word (step F) thus ending the routine.

If in step D a no match condition occurred, this shows that the address did not go to the same destination. Thus, a new path has been followed and a new word must be written for that path. This is done in step E by placing 0 in the status bit and the flag field and writing the complete statistics. The programs returns to step A. At this point the address in the A register has not been changed. This address (which was the destination address of the previous block) is now an entry address for the current interrogation performed in step A.

Assume now that a no match condition occurs after the interrogation performed by step A. In this case, the block being mapped will fall into either case 1, 2, or 4 of FIG. 12. The next step G is to write a partial word in memory using the address as an entry because we know that we must write a new word eventually after we have obtained the full statistics for the block being mapped. In step G a 1 is put in the status bit to signify that a new block is being mapped. In step H the address is moved to the exit field $X_i$ of the interrogation register and an interrogation is performed. If a no match condition occurs, the program moves to step I in which an interrogation is performed with the OP code against a set of branch OP codes stored in the associative memory, to look for a possible branch. If a no match occurs, the program proceeds to step J and receives a new address $A_b$ at the monitor register which is transferred to the A register and then to the entry field of the interrogation register. If a no match condition occurs, the program loops back to step H.

In the simplest case a match occurs at step I which is as case 1 situation. This means that a branch operation code has been found which signifies that an exit address has been found. The program goes to step M. At this point, in the input register is stored the entry, exit, and operation code. The next address that occurs at the monitor register $A_b$ should be a destination address. Since a 1 is written into the status field, an interrogation is now performed in step M on the status field to select that word. In the next step N the word selected by the status bit field is overwritten to complete the statistics and thus end the program loop for that block.

A case 2 situation is discovered when, during the step H–I–J loop, a match occurs in step J. This means that an address has been found that matches the entry address stored in the associative memory. This means that the monitor has been tracing out a string of instructions, one of the address of which runs into a block that has been traced out before. That is, in FIG. 12, case 2, $X_c$ is the same as $N_p$. The monitor program now terminates this stream of instructions as a block. In step H, the next previous instruction had been stored in the exit field so that in the exit position of the input register is the address just previous to the one where a match occurred in the entry position in step J. Thus, the last address must be stored in the destination field. This is accomplished by interrogating with the status bit in step K to obtain the word which was written in step G. Finally, in step N, a 0 is written into the status position along with the exit and destination addresses.

The final case to be considered is case 4 where the entry address occurs somewhere in the middle of the block. But of course, this situation is not recognized immediately. In step A an interrogation is made with the address at the entry field. If a no match condition occurs, then that address has never been encountered before and the monitor branches to step G. A new word is written placing this address in the entry field along with a status bit to flag the new word. The program proceeds to step H and the same address $A_a$ stored in the A register is used to interrogate the exit field of the associative memory. If a no match condition occurs, the program continues in the HIJ loop. Assuming that a match occurs in step H during one of these loops, a case 4 situation has occurred. Thus, the block that we have traced out is a subset of some previously stored block since we have a match for the exit address but no match for the entry address. A 1 is placed in the flag field in step L to show that this subset has been intercepted and it is now discarded from further interrogation. The next address $A_b$ from the monitor register is placed in the destination field of the interrogation register in step M. An interrogation is performed on the status bit to find the word that we are working on and in step N the word is overwritten with the exit and destination addresses to thereby complete the statistics.

While the invention has been particularly shown and described with reference to a preferred embodiment thereof, it will be understood by those skilled in the art that various changes in form and details may be made therein without departing from the spirit and scope of the invention.

What is claimed is:

1. For use with a stored program computer, a program controlled computer monitor comprising:

a plurality of first data paths, each path interfacing with said computer for carrying monitored data representing states of said computer;

an associative memory including an interrogation and mask portion, and having input data paths;

switching means connected to said first data paths and said input data paths energizable for connecting selected ones of said first data paths to selected ones of said input paths; and programmable control means connected to said switching means and adapted to interpret sequential program instructions for selectively energizing said switching means to thereby connect selected input data paths to selected first data paths in accordance with routing instructions contained in said program.

2. The combination according to claim 1 wherein said sequential programmed instructions include an instruction having at least two routing specifications to thereby permit two fields of data to be moved simultaneously and in parallel over said data paths to said associative memory.

3. The combination according to claim 1 wherein said program control means include means energizable by said program for inserting mask information in said masking portion of said associative memory.

4. Apparatus for monitoring a computer comprising:
means for interfacing with monitored states of said computer;
an associative memory including an associative memory input, means for masking portions of said input, and an associative memory output;
a supplementary storage including an input and an output;
arithmetic logic means;
input switching means for selectively connecting said interfacing means to the input of said arithmetic logic means and the output of said arithmetic logic means to the associative memory input and the supplementary storage input;
data path switching means for selectively connecting said interfacing means to the input of said associative memory and the input of said supplementary storage;
word logic means linking said associative memory with said supplementary storage including means for indicating a match or no match condition of words stored in said associative memory with words interrogating said associative memory by means of said input and masking means and means in said word logic for selecting words stored in said supplementary storage;
output switching means for connecting the outputs of said associative memory and said supplementary storage output to said interfacing means; and
control means for controlling data routing by selectively energizing said data path switching means, said output switching means, and said input switching means.

5. Apparatus for monitoring a computer comprising:
registering means for registering monitored states of said computer:
an associative memory including an associative memory input register, a mask register for masking any portion of said input register, and an associative memory output register;

a supplementary storage including an input register and an output register;
an adder;
input switching means for selectively connecting the output of said registering means to the input of said adder and the output of said adder to the associative memory input register and the supplementary storage input register;
a cross-point switch for selectively connecting the output of said registering means to the input of said associative memory and the input of said supplementary storage;
word logic means linking said associative memory with said supplementary storage including means for registering a match or no match condition of words stored in said associative memory with words interrogating said associative memory by means of said input and mask registers and means in said word logic for selecting words stored in said supplementary storage;
output switching means for connecting the outputs of said associative memory output register and said supplementary storage output register to said registering means;
clock means and, connected to the input of said registering means;
control means for controlling data routing by selectively closing and opening the switches of said cross-point switch, said output switching means, and said input switching means;
whereby, upon the condition that a word stored in said associative memory matches a word stored in said input register upon interrogation, said associative memory energizes a match indicator in said word logic which selects a corresponding word in said supplementary storage, and a count field in the selected word stored in supplementary storage is brought out and placed in said adder and caused to be incremented by said clock and returned to said supplementary storage.

References Cited

UNITED STATES PATENTS

| | | | |
|---|---|---|---|
| 3,344,408 | 9/1967 | Singer et al. | 340—172.5 |
| 3,351,910 | 11/1967 | Miller et al. | 340—172.5 |
| 3,377,471 | 4/1968 | Althaus et al. | 340—172.5 X |
| 3,390,380 | 6/1968 | Cooke-Yarborough et al. | 340–172.5 X |

PAUL J. HENON, Primary Examiner

R. F. CHAPURAN, Assistant Examiner

PO-1050
(5/69)

UNITED STATES PATENT OFFICE
CERTIFICATE OF CORRECTION

Patent No. 3,540,003 Dated November 10, 1970

Inventor(s) R. W. Murphy

It is certified that error appears in the above-identified patent and that said Letters Patent are hereby corrected as shown below:

Column 3, line 10, delete the word "now" and on line 11, delete the word "abandoned". In Claim 5, column 18, line 25, delete the word "and," and on line 26 after the word "means;" insert --and,--.

Signed and sealed this 8th day of June 1971.

(SEAL)
Attest:

EDWARD M.FLETCHER,JR.
Attesting Officer

WILLIAM E. SCHUYLER, JR.
Commissioner of Patents